(12) United States Patent
MacArthur et al.

(10) Patent No.: US 10,775,532 B2
(45) Date of Patent: Sep. 15, 2020

(54) ADAPTIVE GUIDED WIND SONDE

(71) Applicant: Innovative Automation Technologies, LLC, Gainesville, FL (US)

(72) Inventors: Donald K. MacArthur, Gainesville, FL (US); Erica Z. MacArthur, Gainesville, FL (US)

(73) Assignee: Innovative Automation Technologies, LLC, Gainesville, FL (US)

( * ) Notice: Subject to any disclaimer, the term of this patent is extended or adjusted under 35 U.S.C. 154(b) by 133 days.

(21) Appl. No.: 16/256,007

(22) Filed: Jan. 24, 2019

(65) Prior Publication Data

US 2020/0025972 A1    Jan. 23, 2020

Related U.S. Application Data

(60) Provisional application No. 62/622,587, filed on Jan. 26, 2018.

(51) Int. Cl.
| | |
|---|---|
| *G01W 1/08* | (2006.01) |
| *G01P 5/02* | (2006.01) |
| *G01P 13/04* | (2006.01) |
| *B64D 1/08* | (2006.01) |

(52) U.S. Cl.
CPC ............ *G01W 1/08* (2013.01); *G01P 5/02* (2013.01); *G01P 13/045* (2013.01); *B64D 1/08* (2013.01)

(58) Field of Classification Search
USPC .......................................... 73/170.16–170.28
See application file for complete search history.

(56) References Cited

U.S. PATENT DOCUMENTS

| | | | |
|---|---|---|---|
| 2009/0326792 A1* | 12/2009 | McGrath ................ | G01W 1/08 701/120 |
| 2011/0218734 A1* | 9/2011 | Solheim ................. | G01W 1/00 702/3 |
| 2014/0043172 A1* | 2/2014 | Manobianco .......... | G01W 1/10 340/870.07 |
| 2014/0224009 A1 | 8/2014 | Brown | |
| 2019/0154874 A1* | 5/2019 | Shams .................... | G01W 1/08 |

FOREIGN PATENT DOCUMENTS

| | | |
|---|---|---|
| CN | 101369028 A | 2/2009 |
| WO | 9302919 | 2/1993 |

* cited by examiner

*Primary Examiner* — Andre J Allen
(74) *Attorney, Agent, or Firm* — Jetter & Associates, P.A.; Neil R. Jetter

(57) ABSTRACT

An adaptive guided wind sonde (AGWS) includes a main body defining a longitudinal axis including a nose end and a tail end including a body that has main wings attached. Secondary wings are on the nose end. A measurement and control system inside the body includes a Global Positioning System (GPS) for providing position and velocity, and an Inertial Measurement Unit (IMU) is for providing inertial measurements. A wing driver is for adjusting a position of at least one of the secondary wings or control surfaces when included on the main wings. A Meteorological Sensor Suite (MSS) is for providing environmental data. An adaptive controller receives data including the position, the velocity, the inertial measurements, and the environmental data for generating wind calculations including a wind speed and a wind direction, and for providing autopilot for the AGWS. Wireless communications is for wirelessly transmitting the wind calculations.

18 Claims, 3 Drawing Sheets

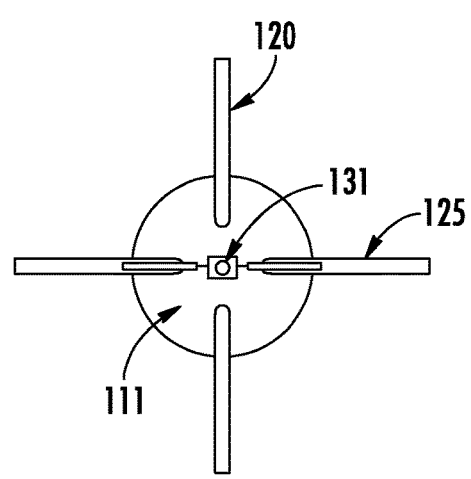
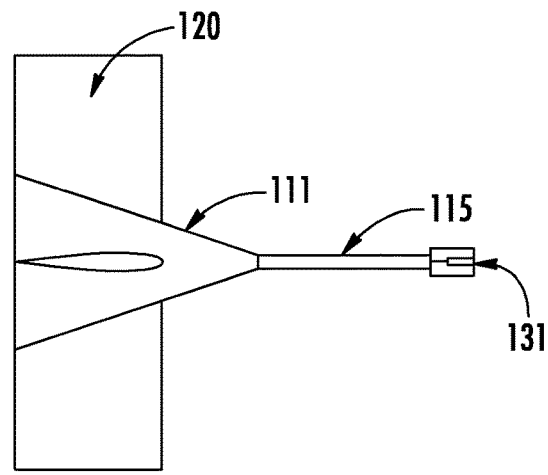
FIG. 2A
FIG. 2B
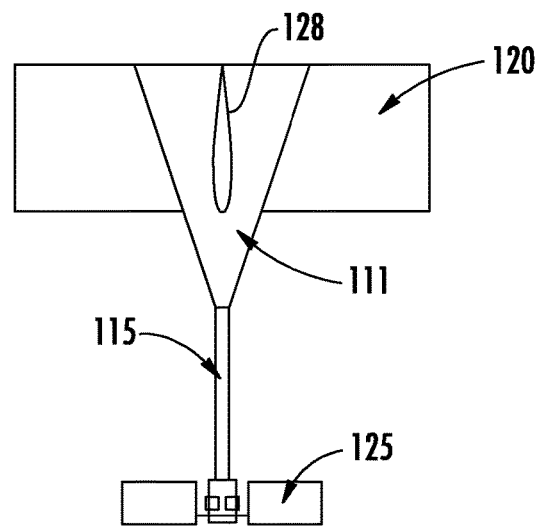
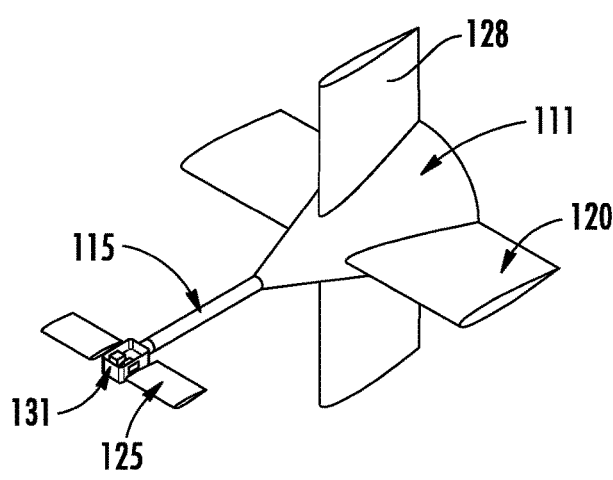
FIG. 2C
FIG. 2D

ADAPTIVE GUIDED WIND SONDE

CROSS REFERENCE TO RELATED APPLICATIONS

This application claims the benefit of Provisional Application Ser. No. 62/622,587 entitled "ADAPTIVE GUIDED WIND SONDE", filed on Jan. 26, 2018, which is herein incorporated by reference in its entirety.

U.S. GOVERNMENT RIGHTS

This invention was made with U.S. Government support under Agency Contract number N0002417C4018 awarded by the U.S. Navy. The Government has certain rights in this invention.

FIELD

Disclosed embodiments relate to radar wind sondes.

BACKGROUND

A radar wind sonde also called a radiosonde as used herein comprises a battery-powered telemetry instrument carried into the atmosphere typically by a weather balloon that measures various atmospheric parameters and transmits them by a radio frequency (RF) link to a ground-based receiver. Modern radiosondes measure or calculate environmental variables including altitude, pressure, temperature, relative humidity, wind (both wind speed and wind direction), cosmic ray readings at high altitude, and geographical position (latitude/longitude). Radiosondes are an essential source of meteorological data, and hundreds are launched all over the world each day.

Radiosondes may operate at an RF frequency of 403 MHz or 1,680 MHz. A radiosonde whose position is tracked as it ascends that provides wind speed and direction information is called a radar wind-sonde (or rawinsonde). Most radiosondes have radar reflectors for tracking and are technically radar wind-sondes. A radiosonde that is dropped from an airplane and falls rather than being carried by a balloon, is called a dropsonde.

SUMMARY

This Summary is provided to introduce a brief selection of disclosed concepts in a simplified form that are further described below in the Detailed Description including the drawings provided. This Summary is not intended to limit the claimed subject matter's scope.

Disclosed adaptive guided wind sondes (AGWSs) recognize known wind sondes primarily utilize either unguided parachute dropsondes or ballistic style high velocity dropsondes. Known parachute dropsondes suffer from being pushed off-course if the winds differ from wind projections. Known ballistic style dropsondes require having to be dropped near to or directly overhead the Drop Zone (DZ).

Disclosed AGWS combine various physical features and capabilities to enable accurate wind speed and direction measurements along a specific trajectory during flight. This helps improve high altitude-low opening (HALO) and high altitude-high opening (HAHO) parachuting and Precision Aerial Delivery Systems (PADS) operations, and landing accuracy. Disclosed AGWS include an aerodynamically-shaped main body generally being cone-shaped on its tail end which allows stable freefall on its descent for obtaining sensed data used for accurate wind speed and direction calculations, and control surfaces and/or aerodynamic structures which allow for transitioning to/from various flight modes to allow for control/correction of the flight trajectory.

A sensor suite is included in an internal cavity inside the cone which provides meteorological measurements (including at least one of air pressure, temperature, and humidity), position, velocity, and inertial data. A processor provides wind calculations including the wind speed and wind direction from the sensed data, and provides control/navigation to the AGWS using the wind calculations and position data. The AGWS also includes communication hardware including at least a transmitter (e.g., a transceiver) and software, and an antenna for wirelessly transmitting the wind calculations to at least one remote recipient.

Disclosed AGWSs include a main body defining a longitudinal axis including a nose end and a tail end that comprises the body which is generally cone-shaped positioned opposite the nose end, where the body is connected to the nose end by a spine. Main wings are on the tail end attached to the body for providing stabilization during freefall and for generating lift during glide that can optionally include control surfaces. The main wings on the nose end can extend from the nose generally perpendicular to the longitudinal axis for providing active stabilization during freefall and glide. A measurement and control system is within an internal cavity inside the body including a Global Positioning System (GPS) for providing a position and a velocity, and an Inertial Measurement Unit (IMU) for providing inertial measurements.

A wing driver is for adjusting the position of the control wings or adjusting the main wings when they include control surfaces, which enables each wing of the wing pairs to be independently actuated or the wings pairs can be actuated together. A Meteorological Sensor Suite (MSS) includes sensors for providing sensed environmental data including at least one of pressure, temperature, and humidity. An adaptive controller including a processor is coupled to receive the position, the velocity, the inertial measurements, and the environmental data for generating wind calculations. The wind calculations include a wind speed, and generally also a wind direction. The adaptive controller is configured for providing closed loop control for autopilot of the AGWS.

BRIEF DESCRIPTION OF THE DRAWINGS

FIGS. 2A-2D provides a front, left, top and trimetric view of a disclosed AGWS, respectively.

DETAILED DESCRIPTION

Figure 1A:
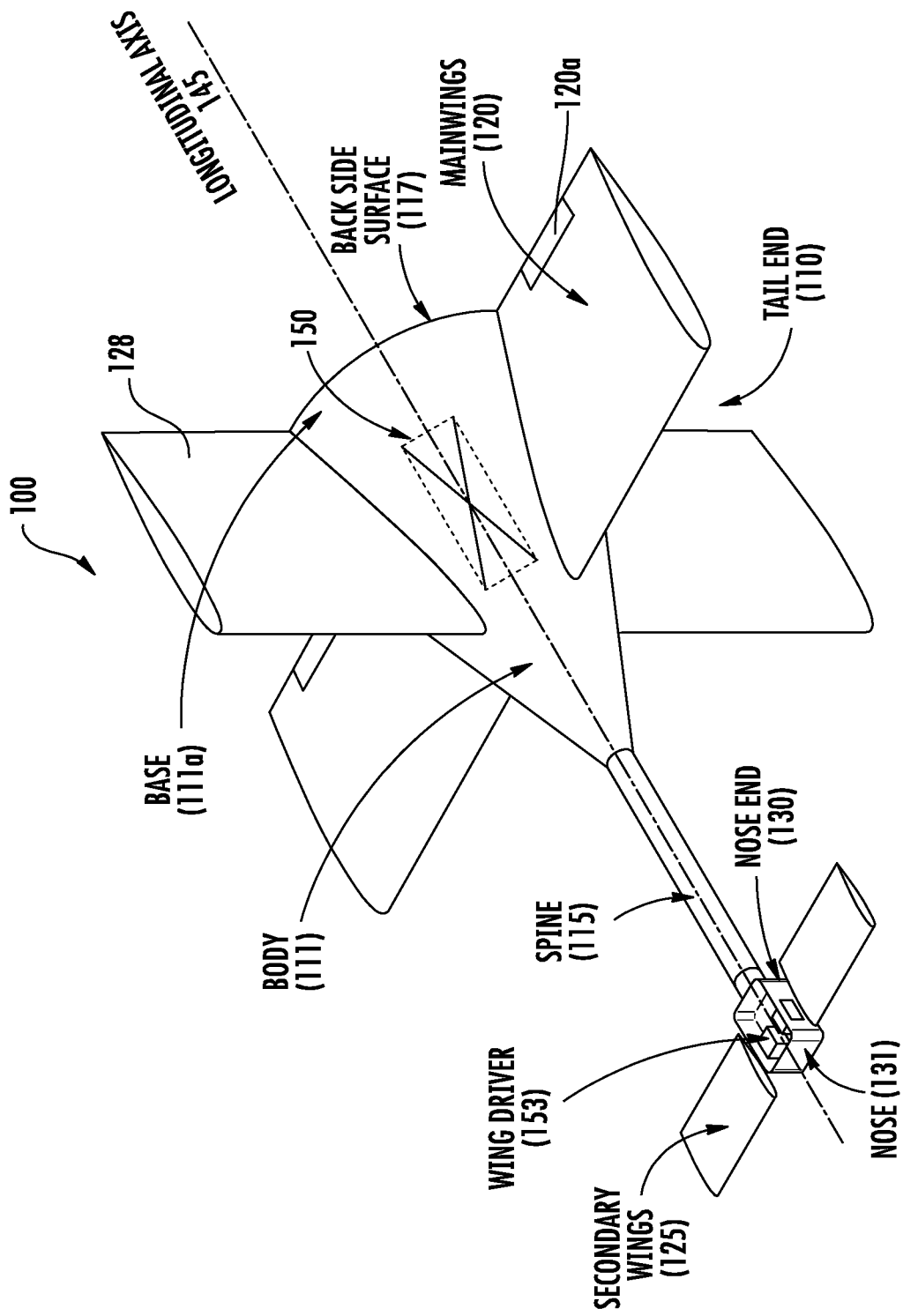
FIG. 1A shows a perspective view of an example AGWS including a disclosed measurement and control system within the body of the AGWS, according to an example aspect.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Figure 1B:
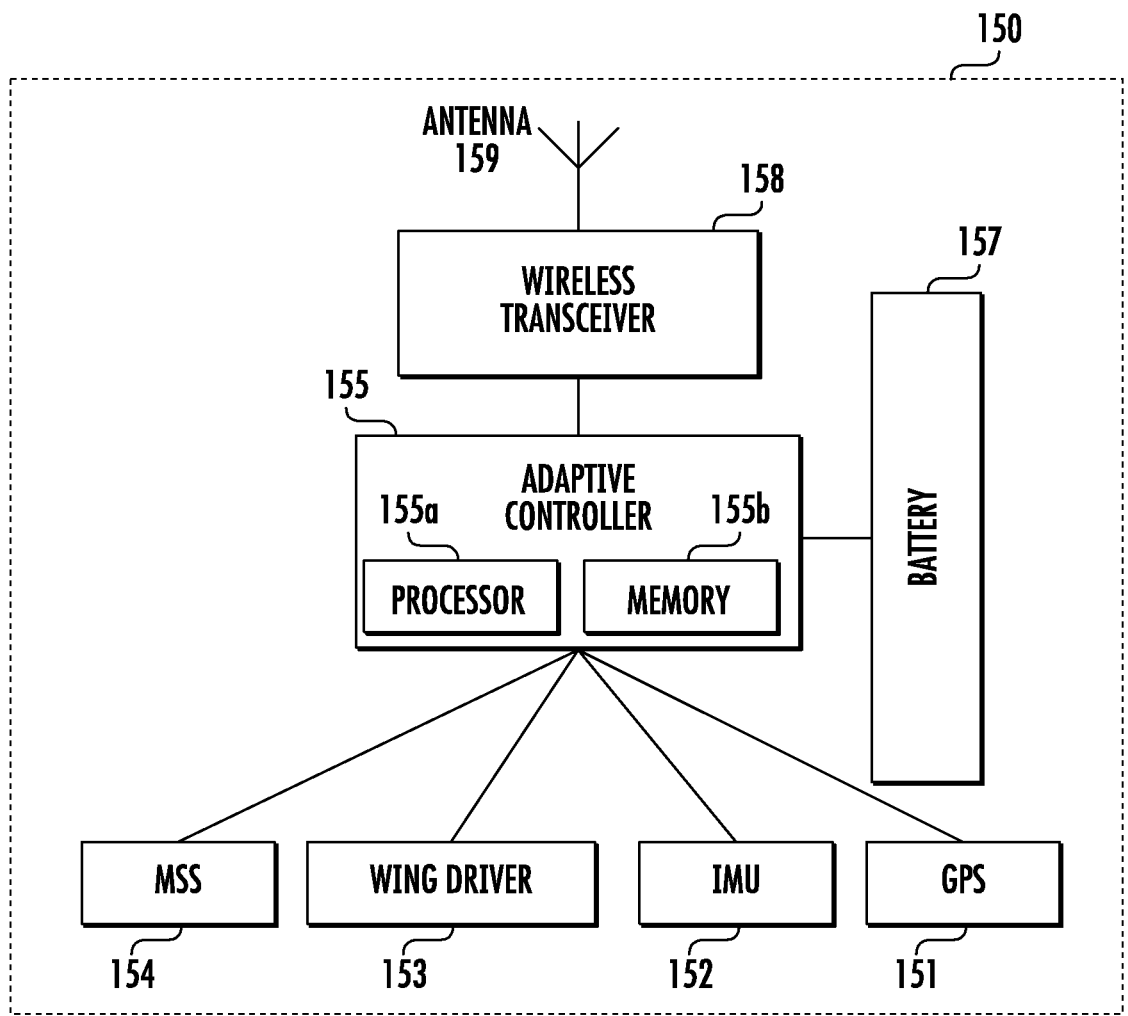
FIG. 1B shows example components of the disclosed measurement and control system shown in FIG. 1A.

FIG. 1A shows a perspective view of an example AGWS 100 including a disclosed measurement and control system 150 positioned within an internal cavity that is inside the body 111 of the AGWS 100, according to an example aspect. FIG. 1B shows example components for the measurement and control system 150. The respective components of the measurement and control system 150 can be all configured on a printed circuit board (PCB). In the case of a PCB implementation, the antenna 159 may be positioned off the PCB.

The AGWS 100 includes a main body defining a longitudinal axis 145 including a nose end 130 including a nose 131, a tail end 110, with the body 111 shown as being cone-shaped on the tail end 110. The main body is thus generally a low ballistic coefficient design for providing stable low/medium velocity freefall. A spine 115 extends along the longitudinal axis 145 from the body 111 to the nose end 130. The body 111 includes a base 111a that defines a back side surface 117. The main wings 120 (which may also be referred to as 'fins') are attached to the body 111 for providing stabilization during freefall and generating lift during glide, and as shown can extend perpendicular to the longitudinal axis 145. However, the main wings 120 can also be tapered or extend out slanted so that they are not perpendicular to longitudinal axis 145.

Flight control for the AGWS 100 can generally be accomplished in two ways, or a combination of these ways By using a 'control wing' as the secondary wing 125 the entire wing can be actuated (e.g., stabilator that combines a stabilizer and elevator) which is the embodiment of the canard configuration shown in FIG. 1. By using a 'control surface' utilizing a portion of another wing, such as the main wings 120 when they are configured as an aileron shown a 120a in FIG. 1, the wings can be actuated to provide flight control. Ailerons are known in the art to be a hinged flight control surface usually forming part of the trailing edge of each wing of a fixed-wing, used to control lateral balance. This Disclosure covers either of these control configuration for any of the wing pairs 120, 125 so that either of the wing pairs can provide complete control, or each of the wing pairs can be controlled.

Secondary wings 125 are shown in FIG. 1 as in an optional canard style arrangement that extend from the nose end 130 perpendicular to the longitudinal axis 145 for providing active stabilization during freefall and glide. There are also vertical-oriented wings 128 for stabilization extending out from the body perpendicular to the main wings 120 and the secondary wings 125.

The AGWS 100 also includes a wing driver 153 at its nose end 130. The wing driver 153 can comprise a variety of different driver arrangements. For example, the wing driver 153 can comprise a servo motor configured using a remote control (RC) servo which includes motor/driver circuitry/feedback sensors in a single package, or can be configured using separate servo motors, driver circuitry, and feedback sensors. As known in the art of motors, a servo motor is a rotary actuator or linear actuator that allows for precise control of angular or linear position, velocity and acceleration that comprises a suitable motor coupled to a sensor for position feedback. The wing driver 153 controls at least one of the secondary wings 125 and the main wings 120 when they include control surfaces. The wing driver 153 can optionally be configured for independently adjusting the position of each of the secondary wings 125 or each of the main wings 120 when they comprise control surfaces.

The measurement and control system 150 as shown in FIG. 1B is powered by a battery 157 and includes a Global Positioning System (GPS) 151 and an Inertial Measurement Unit (IMU) 152. As known in the art, an IMU is an electronic device that measures and reports a body's specific force, angular rate, and generally also the magnetic north. The measurement and control system 150 also includes a Meteorological Sensor Suite (MSS) 154 which includes sensors for providing sensed data including meteorological conditions including at least one of pressure, temperature, and humidity (PTH sensor(s)) as these parameters can all affect the air density. At least a pressure sensor is generally provided. The PTH sensor(s) may be located in the nose 131 to allow sensor exposure to the air. The GPS 151 provides position, and velocity, and can optionally also provide acceleration data. The acceleration may also be calculated by the processor 155a using filtered GPS data (i.e., velocity data used, a derivative derived from the velocity) from the GPS 151 and inertial measurements from the IMU 152.

The measurement and control system 150 also includes an adaptive controller 155 which is shown in FIG. 1B comprising firmware stored in a memory 155b run by the processor 155a that is coupled to receive data from the GPS 151, IMU 152, and from the MSS 154. The processor 155a can comprise a digital signal processor (DSP), a microcontroller, an application specific integrated circuit (ASIC), a general processor, or any other combination of one or more integrated processing devices. The controller 155 is for generating wind calculations including the wind speed and wind direction, and for providing closed loop control for providing autopilot for the AGWS 100 including for stability, mission logic, and trajectory control.

Wireless communications are shown provided by a wireless transceiver 158 that can comprise at least a transmitter coupled to at least one antenna 159 extending outside the body 111, embedded in the body 111 or in the wings 120 or 125, or can be attached to the body 111 as appendages for wirelessly transmitting the wind calculations to remote recipient(s). The wireless transceiver 158 can also optionally also for receiving programming. However, The AGWS can be configured with only a transmitter to only transmit so that its programming is thus not performed wirelessly, instead it is programmed such as by using a cord. The remote recipient can include an aircraft, parachutist(s), a guided cargo parachute system, a balloon, or an unmanned aerial vehicle (UAV).

Disclosed AGWS control their trajectory with wind calculations that are generated during flight that are used to adapt their current trajectory using the secondary wings 125 and/or main wings 120 when they include control surfaces to an updated trajectory that is more beneficial, such as the trajectory for parachuting operations. Disclosed AGWS are thus distinct from known AGWS which can function as dropsondes for atmospheric measurements (e.g., for air quality, and for particulates), but do not provide any trajectory control as they do not have the ability to control their trajectory in the wind column where sensed data used for wind calculations are taken. Consequently, known AGWS cannot adapt their trajectory based on wind conditions along an adjusted trajectory recognized herein as being important particularly to parachuting operations.

Disclosed AGWSs allow for wind velocity calculations to be made along a desired three-dimensional path through the air. The AGWS can dive to accurately measure the sensed data and provide wind calculations therefrom, and then glide to correct/maintain a desired descent trajectory. Alternate embodiments include an alternate wing 120, 125 and/or body 111 structure. The AGWS can be configured using either solid, inflatable, or foldable bodies or aerodynamic structures. This includes inflatable or collapsible wing structures that allow for stow-ability or alternatively, tube deployment. This design can function in the same manner as a solid wing structure design.

There can be alternate shapes besides the conical shape for the body 111. The above-described embodiment includes a conical-shaped body which allows for stable descent through the air column. For example, one can alternatively utilize multifaceted tapered structures or blended shapes for the body 111 to achieve similar or improved aerodynamic performance.

There can also be an alternate plurality and orientation of wings and/or control surfaces. The above-described embodiment includes an aft-plane comprising four wings (120, 128) and a fore-plane with two secondary 125. The AGWS can alternatively generally utilize any number of wings in order to achieve similar or improved aerodynamic performance. For example, there can be three main wings 120 and/or three secondary wings 125 that may be equally spaced radially.

There can be an alternate tail plane versus canard style control. The above-described AGWS embodiment comprises fore and aft plane aerodynamic structures with canard style control wings and optional control surfaces which may be located in main wings 120. The AGWS can also use a conventional wing/tail configuration with the control surfaces located at the rear tail.

Disclosed AGWS are believed to include a unique combination of features. Such features include a low ballistic coefficient design defined herein as a 50 to 200 ft/s freefall velocity body 111 that allows for stable low/medium velocity freefall. The main wings 120 provide stabilization during freefall, and generate lift during glide. Canard style for the secondary wings 125 shown in FIG. 1 provides secondary wings which feature active stabilization during freefall and glide. The GPS 151, IMU 152, and the MSS 154 as described above provide real-time sensed data (meteorological conditions, and position, and velocity) that are used by the adaptive controller 155 to update the calculated wind speed and wind direction. The adaptive controller 155 also provides closed loop control for AGWS stability, mission logic, and trajectory control.

Advantages of disclosed AGWS include combining conventional parachute wind sonde behavior into the design of the body 111 to allow similar stabilized freefall not requiring tilt/heading measurements for wind estimates that may be generated by a high velocity dropsonde. The main wings 120 allow for stabilization and lift to correct trajectory to errors in wind forecast. Canard style for the secondary wings 125 provide controllability of the device not believed to be used in known wind sondes and allow freefall/glide transition and trajectory control. GPS/IMU/MSS allows for improved wind speed/direction calculations and closed loop device control compared with passive/unguided control of other wind sondes. Adaptive control software with real-time sensor data allows for trajectory correction during flight due to wind forecast errors.

Products that can benefit from this Disclosure include AGWS that are designed to assist parachutists to safely navigate to a drop zone based on the winds. Once the AGWS is deployed from an aircraft, essentially real-time wind calculations that are generated can be sent to the parachutists who can then safely navigate the wind column to the DZ location. The system will generally comprise of the AGWS, batteries, battery charger, and operator control unit such as a smart phone, tablet, or laptop. In another similar application, the AGWS can be used for Joint Precision Air Drop System (JPADS). JPADS are unmanned parachute cargo systems that autonomously steer a parafoil with a cargo load to a specific DZ location.

The AGWS can provide the JPADS with the wind calculations prior to deployment to ensure safe navigation to the DZ location. There are other applications including for obtaining meteorological measurements. Wind sondes are typically used for hurricane research and prediction for gathering pressure, temperature, and humidity measurements as well as wind data. For smart gliding munitions, disclosed technology can be applied to improving munition guidance and accuracy or embodied in a gliding munition. For ground sensors disclosed wind sondes can become an aerially deployed unattended ground sensor. If ground sensors are needed throughout an area or region, a disclosed AGWS can "fly" to the desired locations, land, and begin sampling data. In general, disclosed AGWS can incorporate a suite of sensors that can provide environmental measurements through a column of air and then be recovered at a specific location.

Disclosed AGWSs provide an easy to use solution that are compatible/adaptable for use in aircraft, parachuting, or guided cargo pre- and post-deployment. Disclosed AGWSs provide low cost and generally require no additional aircraft modifications. Disclosed AGWSs can be recovered at the DZ to further reduce cost of use or to prevent disclosed technology from being compromised. Disclosed AGWSs can determine wind speed and direction along a specific trajectory, and can provide a complementary function to other technologies further improving accuracy and reliability.

EXAMPLES

Disclosed aspects are further illustrated by the following specific Examples, which should not be construed as limiting the scope or content of this Disclosure in any way.

A prototype AGWS was designed, built, and tested to evaluate the aerodynamic stability of the design and measure its glide performance. The AGWS performed a dive maneuver to collect sensor data for wind calculations, performed a glide maneuver to maintain trajectory/course corrections, alternated between dive and glide maneuvers depending upon wind calculations and the DZ location, and adaptively dived/glided to a pre-programmed DZ location, such as within a 50 meter radius of the DZ. The AGWS also wirelessly sent wind calculation data during flight to a remote recipient.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. An adaptive guided wind sonde (AGWS), comprising:
a main body defining a longitudinal axis including a nose end including a nose and a tail end comprising a body connected to the nose end by a spine;
main wings on the tail end attached to the body;
secondary wings on the nose end extending out from the nose end for providing active stabilization during freefall and glide, and
a measurement and control system inside the body including a Global Positioning System (GPS) for providing a position and a velocity and an Inertial Measurement Unit (IMU) for providing inertial measurements;
a wing driver for adjusting at least one of a position of the secondary wings or the main wings when including control surfaces;
a Meteorological Sensor Suite (MSS) for providing environmental data;
an adaptive controller including a processor coupled to receive data including the position, the velocity, the inertial measurements, and the environmental data for generating wind calculations including a wind speed, and a wind direction at various locations along a trajectory of the AGWS, and for providing closed loop control for autopilot for the AGWS, and
wireless communications including at least a transmitter coupled to the adaptive controller and to at least one antenna for wirelessly transmitting the wind calculations.

2. The AGWS of claim 1, wherein the environmental data includes pressure, temperature, and humidity.

3. The AGWS of claim 1, wherein the secondary wings extend out from the nose perpendicular to the longitudinal axis.

4. The AGWS of claim 3, wherein secondary wings comprise control wings that are configured in a canard style arrangement.

5. The AGWS of claim 1, wherein the main wings include the control surfaces.

6. The AGWS of claim 1, wherein the wireless communications comprises a wireless transceiver including the transmitter and a receiver.

7. The AGWS of claim 1, wherein the wing driver is configured for independently adjusting the position of each of the secondary wings or each of the control surfaces when the main wings include the control surfaces.

8. The AGWS of claim 1, wherein the autopilot for the AGWS utilizes calculating and then recalculating the trajectory of the AGWS during flight based on the position, the wind calculations, a glide performance of the AGWS, and a drop zone location, and wherein the recalculating the trajectory of the AGWS is triggered by a predetermined change in the position or in the wind calculations.

9. The AGWS of claim 1, further comprising vertical-oriented wings for stabilization extending out from the body perpendicular to the main wings and to the secondary wings or the control surfaces when the main wings include the control surfaces.

10. A method of determining wind speed and wind direction along a trajectory of a flight for an adaptive guided wind sonde (AGWS), the method comprising:
releasing the AGWS at altitude, the AGWS configured for:
performing a dive maneuver to collect sensed data comprising environmental data including at least one of a pressure, temperature, and humidity, as well as a position, a velocity, and inertial data;
generating wind calculations including the wind speed and the wind direction from the sensed data;
calculating and then recalculating the trajectory based on the position, the wind calculations, a glide performance of the AGWS, and a drop zone location;
performing a glide maneuver to maintain trajectory corrections;
alternating between the dive and the glide maneuver until reaching the drop zone location, and
wirelessly transmitting the wind calculations to at least one remote recipient.

11. The method of claim 10, wherein the remote recipient comprises an aircraft, a parachutist, or a guided cargo parachute system.

12. The method of claim 10, wherein the AGWS is released from an aircraft.

13. The method of claim 10, wherein the recalculating of the trajectory is triggered by a predetermined change in the position or in the wind calculations.

14. The method of claim 13, wherein the recalculating of the trajectory is triggered by the predetermined change in the wind calculations, and wherein the wind calculations further comprise utilizing previous ones of the wind calculations.

15. The method of claim 13, wherein the recalculating of the trajectory is triggered by the predetermined change in the wind calculations, and wherein the wind calculations comprise current ones of the wind calculations or predicted ones of the wind calculations.

16. The method of claim 10, wherein the AGWS includes wireless communications comprises a transceiver including a transmitter and a receiver, further comprising the receiver receiving programming for the AGWS during the flight.

17. The method of claim 10, wherein the AGWS includes wireless communications comprises a transmitter but not and a receiver, further comprising programming the AGWS during the flight using a cable.

18. An adaptive guided wind sonde (AGWS), comprising:
a main body defining a longitudinal axis including a nose end including a nose and a tail end comprising a body connected to the nose end by a spine;
main wings on the tail end attached to the body;
secondary wings on the nose end extending out from the nose end for providing active stabilization during freefall and glide, and
a measurement and control system inside the body including a Global Positioning System (GPS) for providing a position and a velocity and an Inertial Measurement Unit (IMU) for providing inertial measurements;
a wing driver for adjusting a position of at least the secondary wings;
a Meteorological Sensor Suite (MSS) for providing environmental data including at least pressure;
an adaptive controller including a processor coupled to receive data including the position, the velocity, the inertial measurements, and the environmental data for generating wind calculations including a wind speed, and a wind direction at various locations along a trajectory of the AGWS, and for providing closed loop control for autopilot for the AGWS, and
wireless communications including a wireless transceiver coupled to the adaptive controller and to at least one antenna for wirelessly transmitting the wind calculations.

* * * * *